(12) United States Patent
Flanagan

(10) Patent No.: US 8,949,467 B1
(45) Date of Patent: Feb. 3, 2015

(54) SYSTEMS AND METHODS OF HEADER COMPRESSION IN A SOFTWARE DEFINED NETWORK

(71) Applicant: William A Flanagan, Fairfax, VA (US)

(72) Inventor: William A Flanagan, Fairfax, VA (US)

(*) Notice: Subject to any disclaimer, the term of this patent is extended or adjusted under 35 U.S.C. 154(b) by 0 days.

(21) Appl. No.: 14/142,804

(22) Filed: Dec. 28, 2013

Related U.S. Application Data

(60) Provisional application No. 61/908,056, filed on Nov. 23, 2013.

(51) Int. Cl.
*G06F 15/16* (2006.01)
*H04L 29/06* (2006.01)

(52) U.S. Cl.
CPC ........................ *H04L 69/04* (2013.01)
USPC .......................................... 709/247

(58) Field of Classification Search
USPC .......................... 709/247, 220, 224
See application file for complete search history.

(56) References Cited

U.S. PATENT DOCUMENTS

| 6,549,533 | B1 | 4/2003 | Campbell | |
|---|---|---|---|---|
| 6,816,483 | B1 | 11/2004 | Beckstrom | |
| 7,072,296 | B2* | 7/2006 | Turner et al. | 370/230.1 |
| 7,602,788 | B2 | 10/2009 | Chen et al. | |
| 2006/0088109 | A1* | 4/2006 | Ueda et al. | 375/240.27 |
| 2007/0041375 | A1 | 2/2007 | Bordonaro et al. | |
| 2007/0058539 | A1* | 3/2007 | Bordonaro et al. | 370/230 |
| 2007/0189278 | A1* | 8/2007 | Tu et al. | 370/356 |
| 2008/0212566 | A1* | 9/2008 | Kim et al. | 370/352 |

OTHER PUBLICATIONS

End-to-End Header Compression over Software-Defined Networks: A Low Latency Network Architecture, Jivorasetkul et al., IEEE 2012.
Effnet page web, www.effnet.com, Mar. 2012 (date according to web.archive.org).
RFC 4247, Requirements for Header Compression over MPLS, Nov. 2005.
Effnet Header Compression Product portfolio for Low Bandwidth Wireless Networks.

* cited by examiner

*Primary Examiner* — Vivek Srivastava
*Assistant Examiner* — Normin Abedin
(74) *Attorney, Agent, or Firm* — Jackson Patent Law Office

(57) ABSTRACT

A method of header compression steps, performed by a first processor, of receiving a first packet-header sent from a second processor, the first packet-header having been sent in response to the second processor receiving the first packet-header encapsulated in a frame, and the frame not matching a flow table entry in the second processor. The method also includes sending a first signal to the second processor; sending a first flow table entry to the second processor; sending a second signal to a third processor; and sending a second flow table entry to the third processor. The first signal causes the second processor to generate substitute data in response to subsequently receiving a second packet-header, the substitute data being shorter that the second packet-header, the substitute data corresponding to the first signal. The second signal causes the third processor to generate the second packet-header, responsive to the substitute data subsequently received from the second processor, in accordance with the second signal.

28 Claims, 15 Drawing Sheets

```xml
<?xml version="1.0" encoding="UTF-8"?>
<contextMessage>
  <L3>
    <type>IP</type>
    <version>4.5</version>
    <source>...</source>
    <destination>192.1.32.2</destination>
  </L3>
  <L4>
    <type>UDP</type>
    <version>3.4</version>
    <source>1234567654321</source>
    <destination>1234567654321</destination>
    <port>56</port>
  </L4>
</contextMessage>
```

COMPRESSION CONTEXT 112 SENT FROM CONTROLLER TO INGRESS SWITCH

Figure 5

```xml
<?xml version="1.0" encoding="UTF-8"?>
<contextMessage>
  <L3>
    <type>IP</type>
    <version>4.5</version>
    <source>...</source>
    <destination>192.1.32.2</destination>
  </L3>
  <L4>
    <type>UDP</type>
    <version>3.4</version>
    <source>1234567654321</source>
    <destination>1234567654321</destination>
    <port>56</port>
  </L4>
</contextMessage>
```

DECOMPRESSION CONTEXT 114
SENT FROM CONTROLLER TO EGRESS SWITCH

Figure 6

L2 header | IP header | UDP header | payload

FRAME RECEIVED AT INGRESS

Figure 7

DLCI | compressed IP header and compressed UDP header data | payload

FRAME GENERATED AT INGRESS

Figure 8

L2 header | IP header | UDP header | payload

FRAME GENERATED AT EGRESS

Figure 10

L2 header | IP header (IP destination address 192.1.32.2) | UDP destination header | payload (voice data)

FRAME RECEIVED AT INGRESS

Figure 12

DLCI (0570) | payload (voice data)

FRAME GENERATED AT INGRESS

Figure 13

L2 header | IP header (IP destination address 192.1.32.2) | UDP destination header | payload (voice data)

FRAME GENERATED AT EGRESS

Figure 14

L2 header | IP header (IP destination address 192.1.32.2)| UDP header | payload (voice data)

FRAME RECEIVED AT INGRESS

Figure 19

DLCI (0570) | payload (voice data)

FRAME GENERATED AT INGRESS

Figure 20

DLCI (0375) | payload (voice data)

FRAME GENERATED AT INTERMEDIATE SWITCH

Figure 21

L2 header | IP header (IP destination address 192.1.32.2)| UDP header | payload (voice data)

FRAME GENERATED AT EGRESS

Figure 22

SYSTEMS AND METHODS OF HEADER COMPRESSION IN A SOFTWARE DEFINED NETWORK

This Application claims the benefit of U.S. Provisional Patent Application 61/908,056 filed 23 Nov. 2013 of WILLIAM A. FLANAGAN for SYSTEMS AND METHODS OF HEADER COMPRESSION IN A SOFTWARE DEFINED NETWORK, the contents of which are herein incorporated by reference.

BACKGROUND OF THE INVENTION

1. Field of the Invention

This invention relates generally to data compression and, more particularly, to systems and methods of header compression.

2. Description of Related Art

In a typical voice over IP (Internet Protocol) process, the number of bits used for header information is a substantial percentage of the packet size and, in fact, can exceed the number of bits used for the voice payload.

SUMMARY OF THE INVENTION

To address the problem above, there is a method comprising steps, performed by a first processor, of receiving a first packet-header sent from a second processor, the first packet-header having been sent in response to the second processor receiving the first packet-header encapsulated in a frame, and the frame not matching a flow table entry in the second processor; sending a first signal to the second processor; sending a first flow table entry to the second processor; sending a second signal to a third processor; and sending a second flow table entry to the third processor, wherein sending the first signal causes the second processor to generate substitute data in response to subsequently receiving a second packet-header, the substitute data being shorter that the second packet-header, the substitute data corresponding to the first signal, and sending the second signal causes the third processor to generate the second packet-header, responsive to the substitute data subsequently received from the second processor, in accordance with the second signal.

According to another aspect of the present invention, there is a processor comprising circuitry configured to receive a first packet-header sent from a second processor, the first packet-header having been sent in response to the second processor receiving the first packet-header encapsulated in a frame, and the frame not matching a flow table entry in the second processor; circuitry configured to send a first signal to the second processor; circuitry configured to send a first flow table entry to the second processor; circuitry configured to send a second signal to a third processor; and circuitry configured to send a second flow table entry to the third processor. The first signal causes the second processor to generate substitute data in response to subsequently receiving a second packet-header, the substitute data being shorter that the second packet-header, the substitute data corresponding to the first signal, and the second signal causes the third processor to generate the second packet-header, responsive to the substitute data subsequently received from the second processor, in accordance with the second signal.

According to yet another aspect of the present invention, there is a processor comprising means for receiving, in a control plane, a first packet-header sent from a second processor, the first packet-header having been sent in response to the second processor receiving the first packet-header encapsulated in a frame in a data plane, and the frame not matching a flow table entry in the second processor; means for sending, in the control plane, a first signal to the second processor; means for sending, in the control plane, a first flow table entry to the second processor; means for sending, in the control plane, a second signal to a third processor; and means for sending, in the control plane, a second flow table entry to the third processor. The first signal causes the second processor to generate substitute data in response to subsequently receiving a second packet-header, the substitute data being shorter that the second packet-header, the substitute data corresponding to the first signal, and the second signal causes the third processor to generate the second packet-header, responsive to the substitute data subsequently received from the second processor, in accordance with the second signal.

BRIEF DESCRIPTION OF THE DRAWINGS

References are made, in the following text, to the accompanying drawings, in which:

FIG. 5 is a diagram showing a compression context sent from a central controller to an ingress switch in the exemplary system.

FIG. 6 is a diagram showing a compression context sent from the central controller to an egress switch in the exemplary system.

FIG. 7 is a diagram showing data plane information received at the ingress switch.

FIG. 8 is a diagram showing data plane information generated by the ingress switch and sent to the egress switch.

FIG. 10 is a diagram showing data plane information generated by the egress switch.

FIG. 12 is a diagram showing data plane information received at the ingress switch in the second exemplary system.

FIG. 13 is a diagram showing data plane information generated by the ingress switch and sent to the egress switch in the second exemplary system FIG. 14 is a diagram showing data plane information generated by the egress switch in the second exemplary system.

FIG. 19 is a diagram showing data plane information received at the ingress switch in the third exemplary system.

FIG. 20 is a diagram showing data plane information generated by the ingress switch and sent to an intermediate switch in the third exemplary system.

FIG. 21 is a diagram showing data plane information generated by the intermediate switch and sent to the egress switch in the third exemplary system FIG. 22 is a diagram showing data plane information generated by the egress switch in in the third exemplary system.

The accompanying drawings which are incorporated in and which constitute a part of this specification, illustrate embodiments of the invention and, together with the description, explain the principles of the invention, and additional advantages thereof. Certain drawings are not necessarily to scale, and certain features may be shown larger than relative actual size to facilitate a more clear description of those features. Throughout the drawings, corresponding elements are labeled with corresponding reference numbers.

DETAILED DESCRIPTION OF EXEMPLARY EMBODIMENTS

Figure 1:
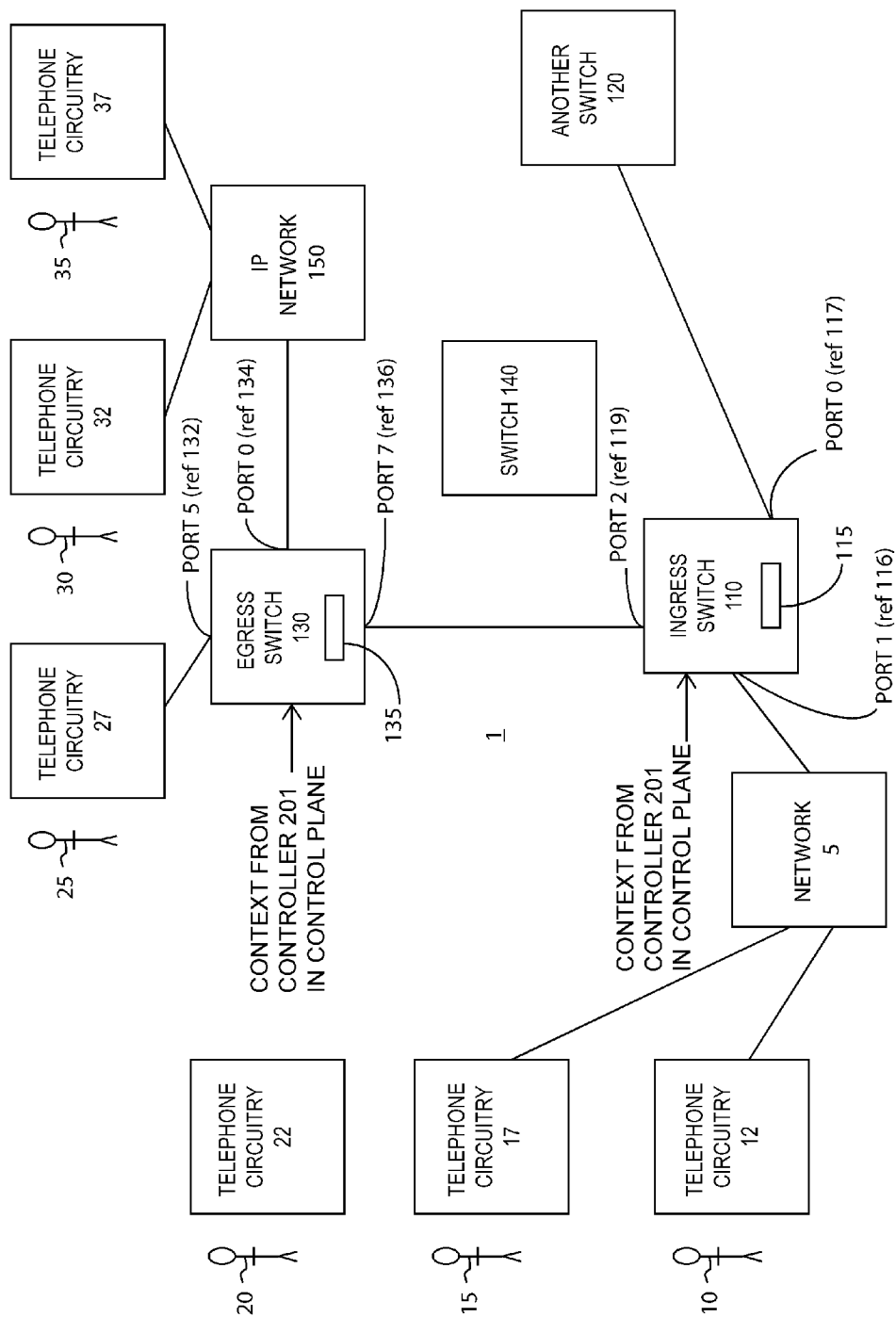
FIG. 1 is a diagram showing an exemplary system using header compression to effect a telephone call using a software defined network, in accordance with an exemplary embodiment of the present invention.

FIG. 1 shows a communication system 1 according to an exemplary embodiment of the present invention. FIG. 1 emphasizes a data plane.

Switches 110, 120, 140, 130 are interconnected in a frame relay network. Switches 110, 120, 140, 130 constitute a software defined network, that is part of an access network to the telephone system of the Acme Telephone Company.

Network 5 is in communication with the ingress switch 110. Network 5 is the global Internet. Alternatively, network 5 could be an analog PBX, another private IP (Internet Protocol) network etc.

The owner of network 5 and the owner of Acme Telephone Company are non-affiliated, meaning that they are not affiliates with respect to each other. In this Patent Application, concerns are affiliates of each other when one concern controls or has the power to control the other, or a third party or parties controls or has the power to control both. Power to control is described in Section 121 of the U.S. regulations of the Small Business Administration.

The egress switch 130 includes a physical inlet port 136 having physical port number 7, a physical outlet port 132 having physical port number 5, and a physical outlet port 134 having physical port number 0. A physical port is a switch defined port that corresponds to a hardware interface of the switch.

The ingress switch 110 includes a physical inlet port 116 having physical port number 1, a physical outlet port 117 having physical port number 0, and a physical outlet port 119 having physical port number 2. The ingress switch 110 is typically separated from egress switch 130 by more than 1 kilometer.

The ingress switch 110 includes an electronic memory that stores flow table 115. At the time depicted in FIG. 1, flow table 115 includes the following entries:
Values to be matched: physical inlet port 1, destination IP address 192.103.45.27, destination UDP port 375
Action: DLCI 0321, physical outlet port number 2
Values to be matched: physical inlet port 1, destination IP address 192.103.45.37, destination UDP port 375
Action: DLCI 0164, physical outlet port number 2

Flow Table 115

The flow table also controls how the switch handles the frame (priority for example, or another policy) as well as where the frame is sent (physical exit port).

Figure 2:
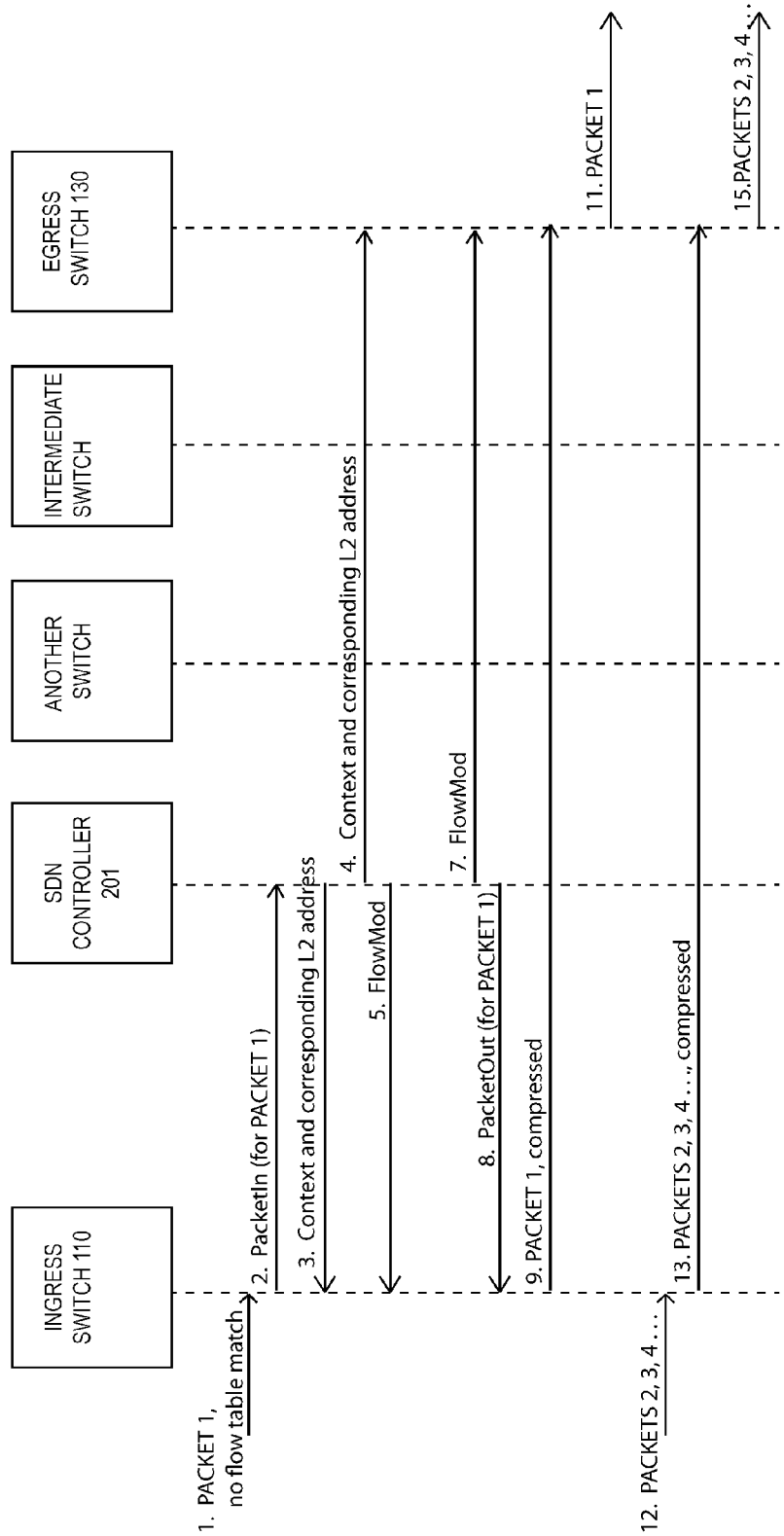
FIG. 2 is a diagram showing a sequence of messages in the exemplary system.

Subsequently, a person 15 places a telephone call to a person 30 via telephone circuitry 17. As a result, the ingress switch 110 receives a frame on physical inlet port 116 (FIG. 2, message 1). The received frame encapsulates an OSI (Open Systems Interconnection) layer 3 header having a destination IP address 192.1.32.2. Message 1 does not match any entry of flow table 115 at the time shown above.

In this Patent Application, the word circuitry encompasses dedicated hardware, and/or programmable hardware, such as a central processing unit (CPU) or reconfigurable logic array, in combination with programming data, such as sequentially fetched CPU instructions or programming data for a reconfigurable array. Thus, circuitry encompasses, for example, a general-purpose electronic processor programmed with software, acting to carry out a described function.

Figure 3:
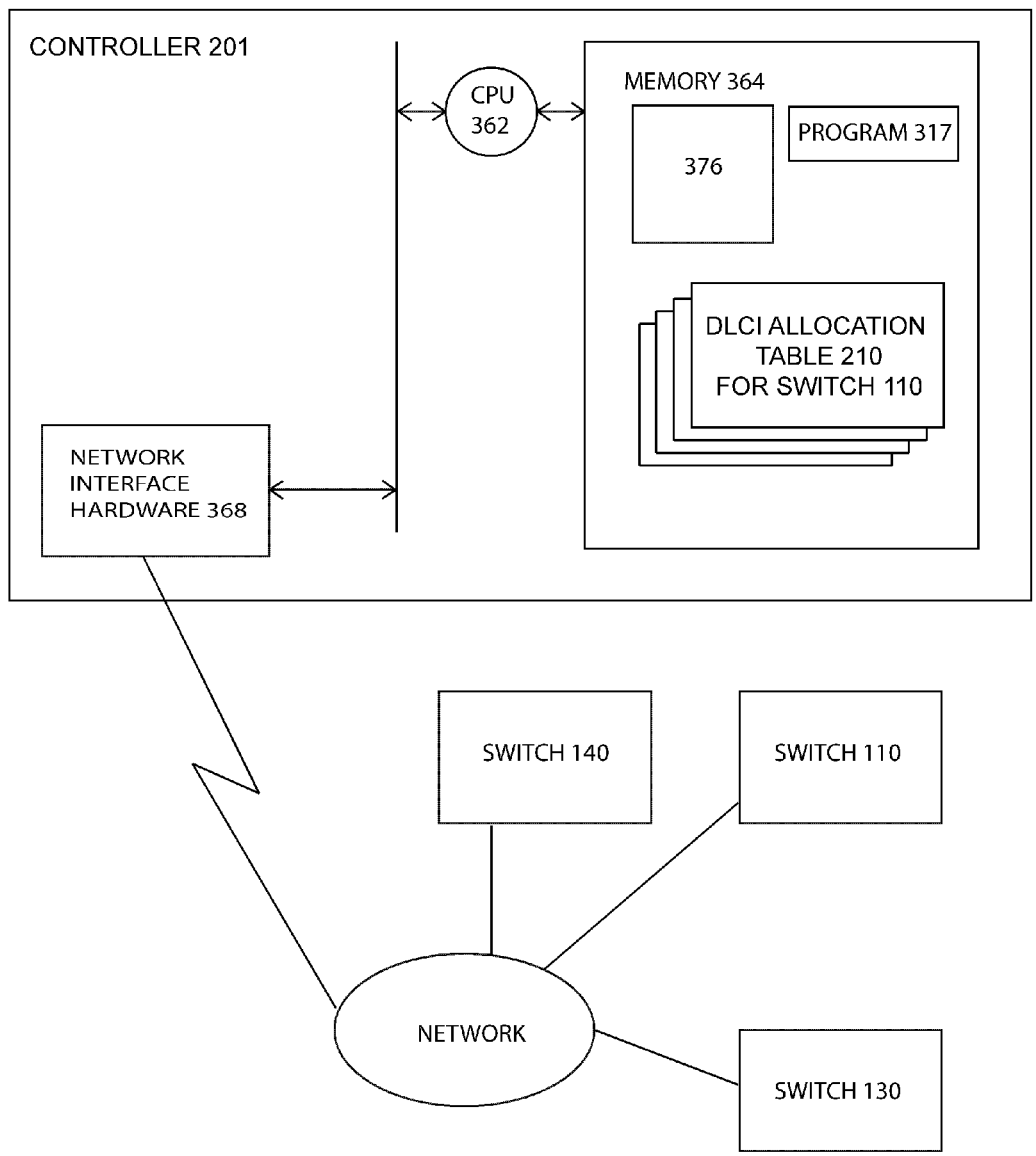
FIG. 3 is a diagram emphasizing a control plane in the exemplary system.

Circuitry in the ingress switch 110 compares the incoming packet to each entry of the flow table 115 and, responsive to not detecting a match, forwards the packet header (FIG. 2, message 2) to controller 201, shown in FIG. 3.

FIG. 3 emphasizes a control plane, with controller 201 communicating with switches 110, 140, 120, and 130 via network interface hardware 368. The controller 201 is typically separated from ingress switch 110 by more than 1 kilometer. The controller 201 is typically separated from egress switch 130 by more than 1 kilometer.

In this Patent Application, the control plane is a logical construct that can be implemented with hardware common to that used to implement the data plane, or can be implemented with hardware different from that used to implement the data plane.

The controller 201, of the software defined network, includes a central processing unit 362, a random access memory 364, and network interface hardware 368.

Processor 362 executes program 317 stored in memory 364, to receive, process, and generate various control plane messages.

In response to message 2, CPU 362 and program 317 act to search the DLCI allocation table 210, to locate a currently unused data link connection identifier (DLCI) for a connection from ingress switch 110. A DLCI is a type of layer 2 destination address. An exemplary DLCI is 10 bits long.

The controller 201 subsequently sends a compression context, and corresponding layer 2 header data, to the ingress switch 110. (FIG. 2, message 3). The layer 2 header data includes an unused DLCI (having octal value 0570) found in allocation table 210.

The controller 201 sends a flow table entry, corresponding to the layer 2 header data, to the ingress switch 110. (FIG. 2, message 5). Controller 201 may send messages 3 and 5 at the same time, in a common frame.

In response to message 5, the ingress switch 110 generates the following flow table 115:
Values to be matched: physical inlet port 1, destination IP address 192.103.45.27, destination UDP port 375
Action: DLCI 0321, physical outlet port number 2
Values to be matched: physical inlet port 1, destination IP address 192.103.45.37, destination UDP port 375
Action: DLCI 0164, physical outlet port number 2
Values to be matched: physical inlet port 1, destination IP address 192.1.32.2, destination UDP port 375
Action: DLCI 0570, physical outlet port number 2

Flow Table 115

Figure 4:
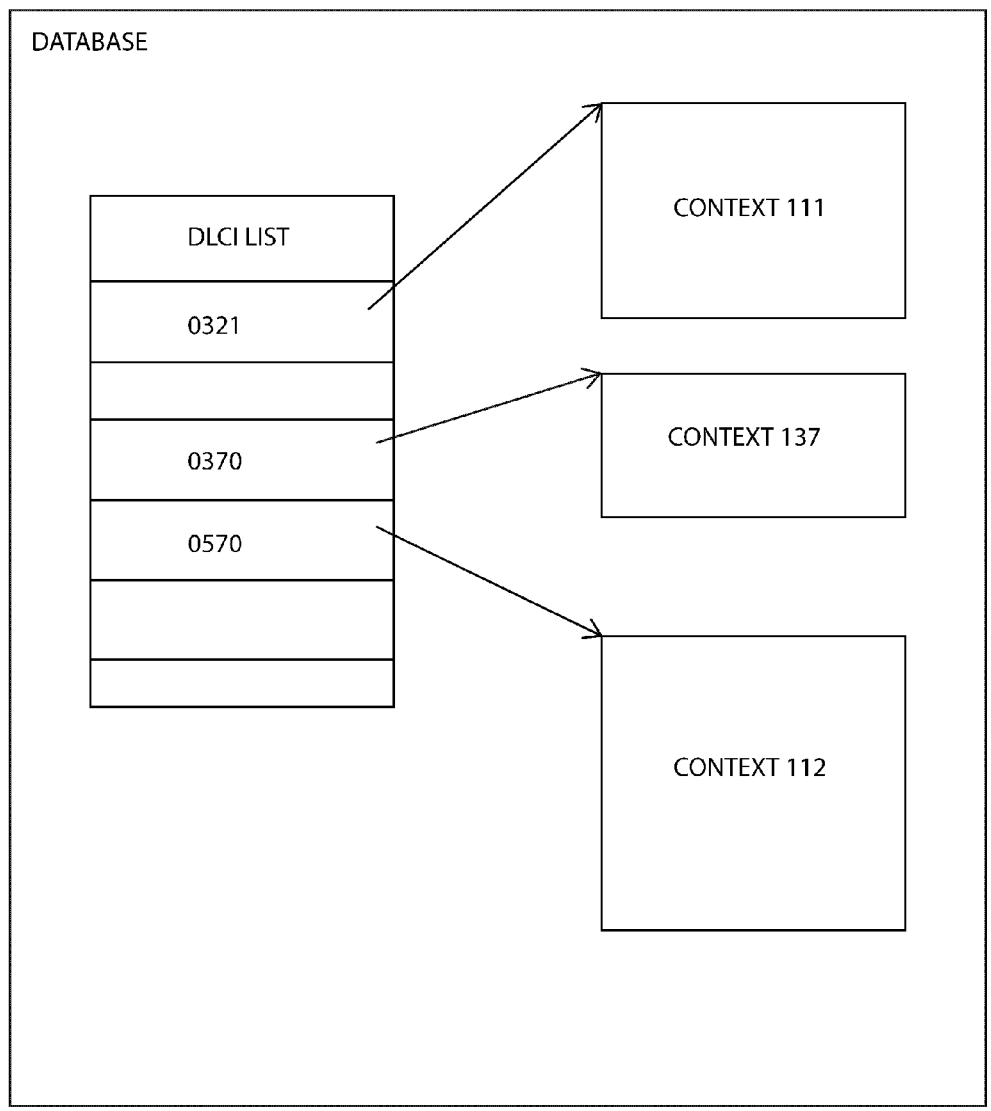
FIG. 4 is diagram showing a data structure in ingress switch 110, to link a flow table entry to a compression context.

In response to receiving message 3, the ingress switch 110 generates the data structure shown in FIG. 4, to associate the DLCI value 0570 with a compression context having patent application reference number 112. Thus, in effect, the DLCI value 0570 acts as a context identifier.

In the data structures shown in the figures, lines represent a reference, such as a pointer, between one element and another. These references are not necessarily direct memory address pointers. Instead, more generally, each reference is a data entity, stored in association with one (referencing) element, that enables a processor to find a related (referenced) element. To physically address the referenced element, the processor may subject the reference to various translations or mappings.

FIG. 5 shows message 2 in more detail. Message 2 includes text data in XML format. The textual tag L3 designates OSI layer 3, and the textual tag L4 designates OSI layer 4.

In response to receiving message 2, ingress switch 110 converts the text data to a binary format and stores the binary format in context table 112 shown in FIG. 4.

The controller 201 sends a decompression context, and the corresponding layer 2 header data, to the egress switch 130. (FIG. 2, message 4).

The controller 201 does not send digital samples of voice data (voice payload) to the egress switch 130. Thus, the data sent by the controller 201, to the egress switch 130, excludes part of the layer 4 packet received by the ingress switch 110.

The controller 201 does not send the length field of the layer 4 header to the egress switch 130. Thus, the data sent by the controller 201, to the egress switch 130, excludes part of the layer 4 header information received by the ingress switch 110.

Figure 9:
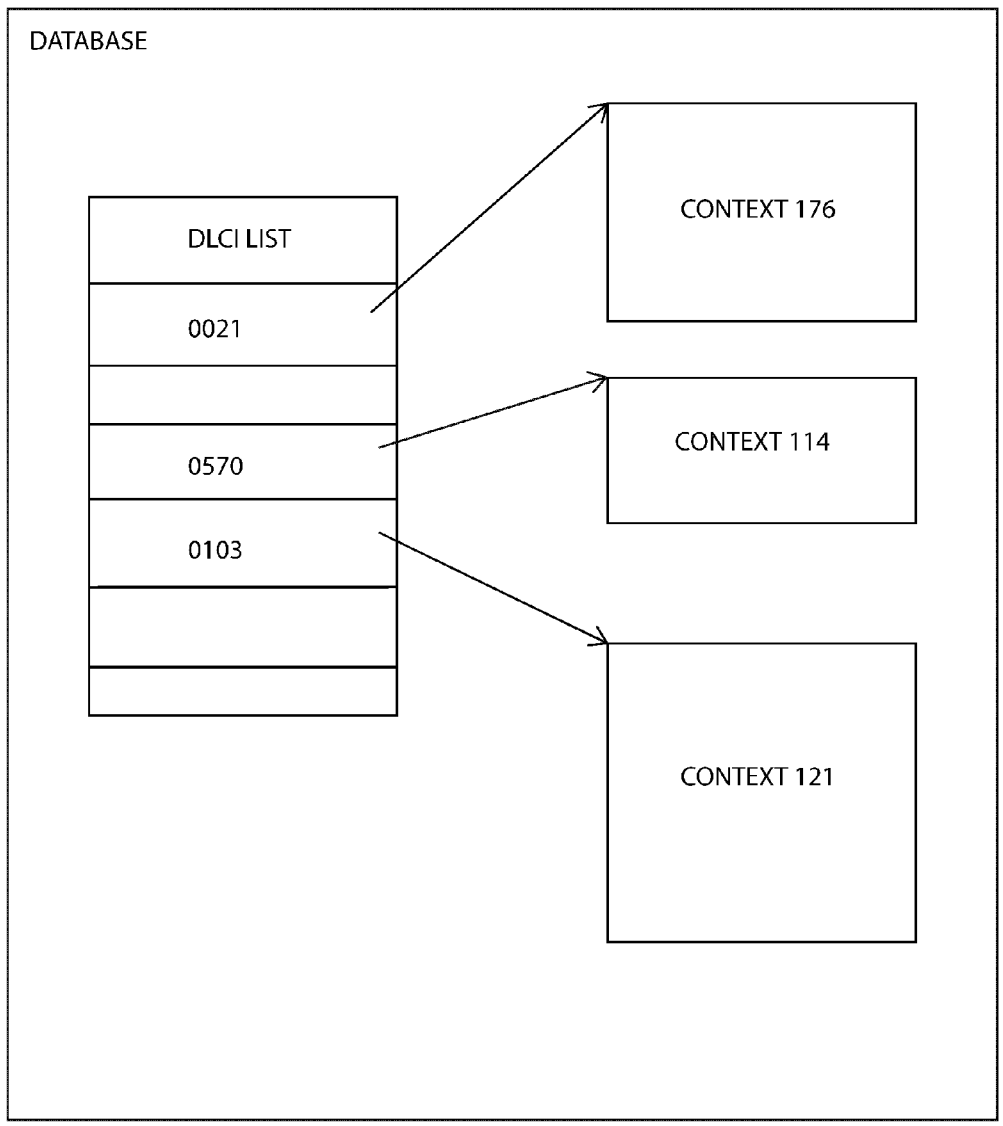
FIG. 9 is diagram showing a data structure an egress switch, to link a flow table entry (or DLCI) to a decompression context.

In response to receiving message 4, the egress switch 130 generates the data structure shown in FIG. 9, to associate DLCI 0570 with decompression context 114. Decompression context 114 corresponds to compression context 112. Thus, in effect, the DLCI acts as a context identifier.

In this first exemplary embodiment, the decompression context 114 is the same as the compression context 112.

The controller 201 sends a flow table entry, corresponding to the layer 2 header data, to the egress switch 130. (FIG. 2, message 7).

In response to message 7, the egress switch 13 generates the following entry in flow table 135.

Values to be matched: physical inlet port 7, layer 2 address 0570 Action: physical outlet port number 0

Flow Table 135

The controller 201 instructs the ingress switch to send PACKET 1. (FIG. 2, message 8).

The ingress switch 110 replaces the headers, from layers 3 and 4, with their compressed equivalent, (FIG. 2, message 9), using Van Jacobson header compression, for example.

The egress switch receives the layer 2 frame, and uses the layer 2 header to access the corresponding context, and decompress the frame, restoring the full headers for layers 3 and 4. (FIG. 2, message 11).

Subsequent packets (messages 12) belonging to this flow (matching this flow table entry) are compressed by the switch 110, and sent by the switch 110, to the egress switch 130 (messages 13) without passing through the controller 201.

More specifically, FIG. 7 shows a message 12 received at the ingress switch 110. The message 12 includes a destination IP header address, and destination IP packet length. The switch 110 uses, inter alia, the IP header destination address to match the third entry in flow table 115.

In response to matching the flow table entry, switch 110 replaces the IP header and UDP (User Datagram Protocol) header with a compressed IP header and a compressed UDP header. The compressed data does not include a destination IP address. The compressed IP header does not include a length of the IP packet.

Switch 110 generates a message 13, shown in FIG. 2, and in more detail in FIG. 8. Message 13 does not include the IP header of message 12 or the UDP header of message 12.

When egress switch 130 receives a message 13, switch 130 uses, inter alia, the DLCI received in the message to match an entry in flow table 135. Egress switch 130 also uses the DLCI to find a decompression context, in the database shown in FIG. 9.

Responsive to the matching of the flow table entry, egress switch 130 replaces the compressed data with a complete IP header, and complete UDP header, thereby generating a message 15 shown in FIG. 2, and in more detail in FIG. 10.

Second Exemplary System

Figure 11:
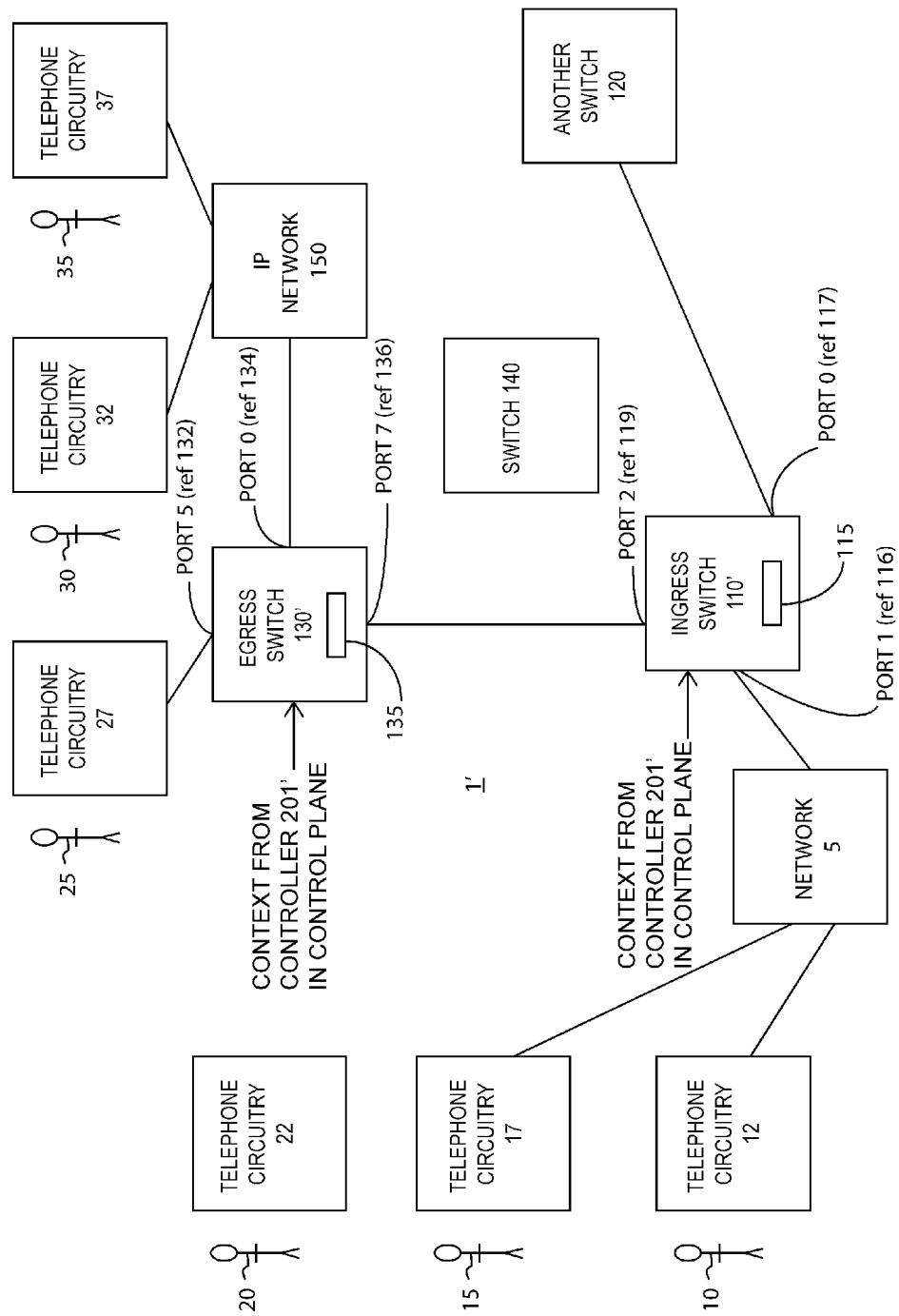
FIG. 11 is a diagram showing an exemplary system in accordance with a second exemplary embodiment of the present invention.

FIG. 11 shows a communication system 1' according to another exemplary embodiment of the present invention.

FIG. 12 is a diagram showing data plane information received at the ingress switch 110'.

FIG. 13 is a diagram showing data plane information generated by the ingress switch 110'.

FIG. 14 is a diagram showing data plane information generated by the egress switch 130'.

In the second exemplary system, instead of using Van Jacobson header compression for layers 3 and 4, the ingress switch 110' does not send IP header data or UDP header data to the egress switch 130'.

Instead, as shown in FIG. 13, the switch 110' sends, to the switch 130', a frame that essentially includes only a DLCI, as the layer 2 header and context identifier, and a payload.

Third Exemplary System

Figure 15:
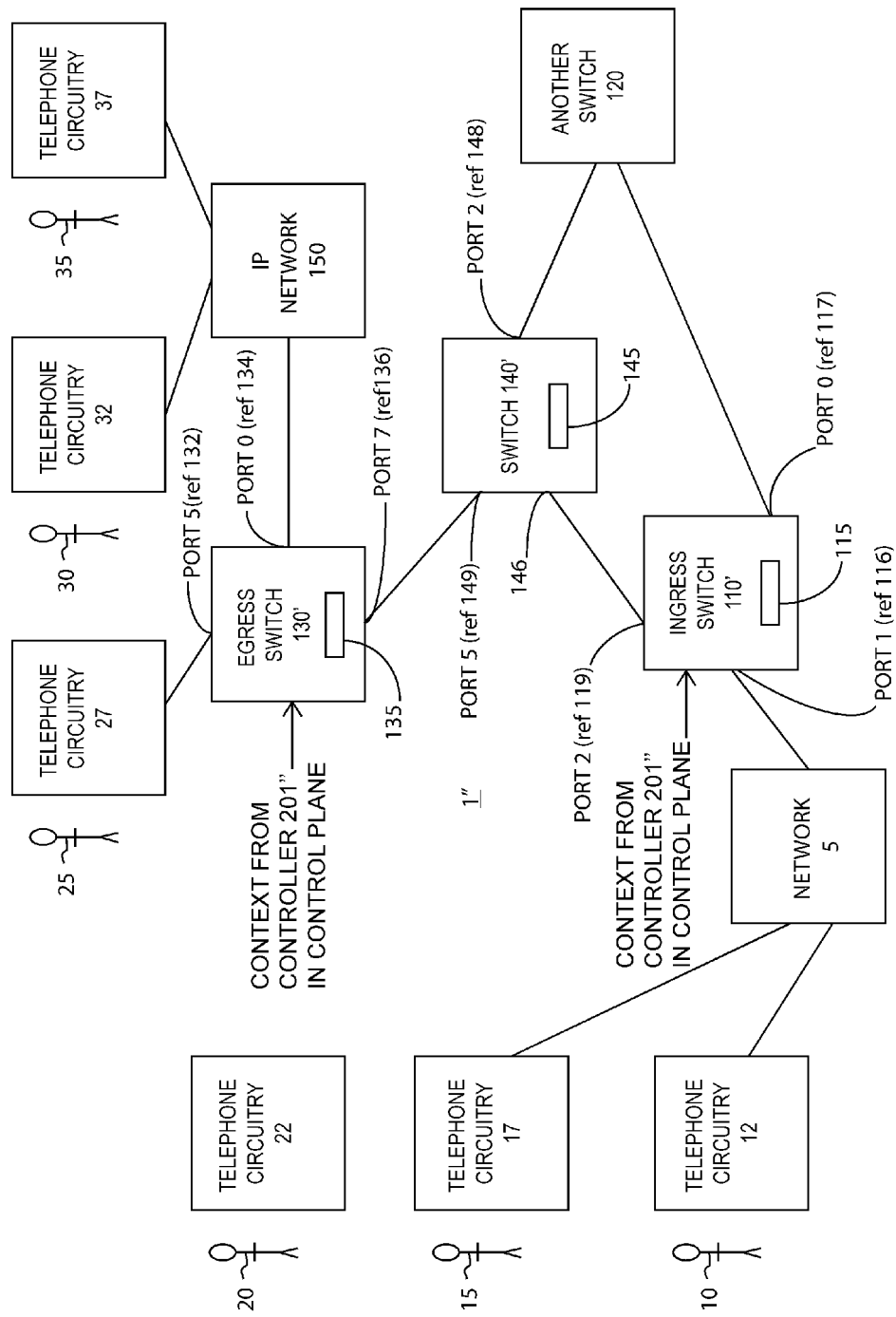
FIG. 15 is a diagram showing an exemplary system in accordance with a third exemplary embodiment of the present invention.

FIG. 15 shows a communication system 1" according to another exemplary embodiment of the present invention. The third exemplary system has all the structure and functionality of the second exemplary system described above, plus the additional structure and functionality described below.

In the third exemplary system, the ingress switch 110' does not send IP header data or UDP header data to the egress switch 130'. Instead, as shown in FIG. 20, the switch 110' sends a frame that essentially includes only a DLCI, acting as the layer 2 header, and a payload.

As shown in FIG. 21, responsive to receiving the frame of FIG. 20, the switch 140' sends, to the switch 130', a frame that essentially includes only a DLCI, acting as both the layer 2 header and context identifier, and a payload.

More specifically, the ingress switch 110' includes a physical inlet port 116 having physical port number 1, a physical outlet port 117 having physical port number 0, and a physical outlet port 119 having physical port number 2.

The ingress switch 110' includes an electronic memory that stores flow table 115. At the time depicted in FIG. 15, flow table 115 includes the following entries:

Values to be matched: physical inlet port 1, destination IP address 192.103.45.27, destination UDP port 375
Action: DLCI 0321, physical outlet port number 2
Values to be matched: physical inlet port 1, destination IP address 192.103.45.37, destination UDP port 375
Action: DLCI 0164, physical outlet port number 2

Flow Table 115

The switch 140' includes a physical inlet port 146 having physical port number 1, a physical outlet port 149 having physical port number 5, and a physical outlet port 148 having physical port number 2.

The switch 140' includes an electronic memory that stores flow table 145. At the time depicted in FIG. 15, flow table 145 includes the following entries:
Values to be matched: physical inlet port 1, DLCI 0321
Action: DLCI 0322, physical outlet port number 5
Values to be matched: physical inlet port 1, DLCI 0164
Action: DLCI 0442, physical outlet port number 5

Flow Table 145

Figure 16:
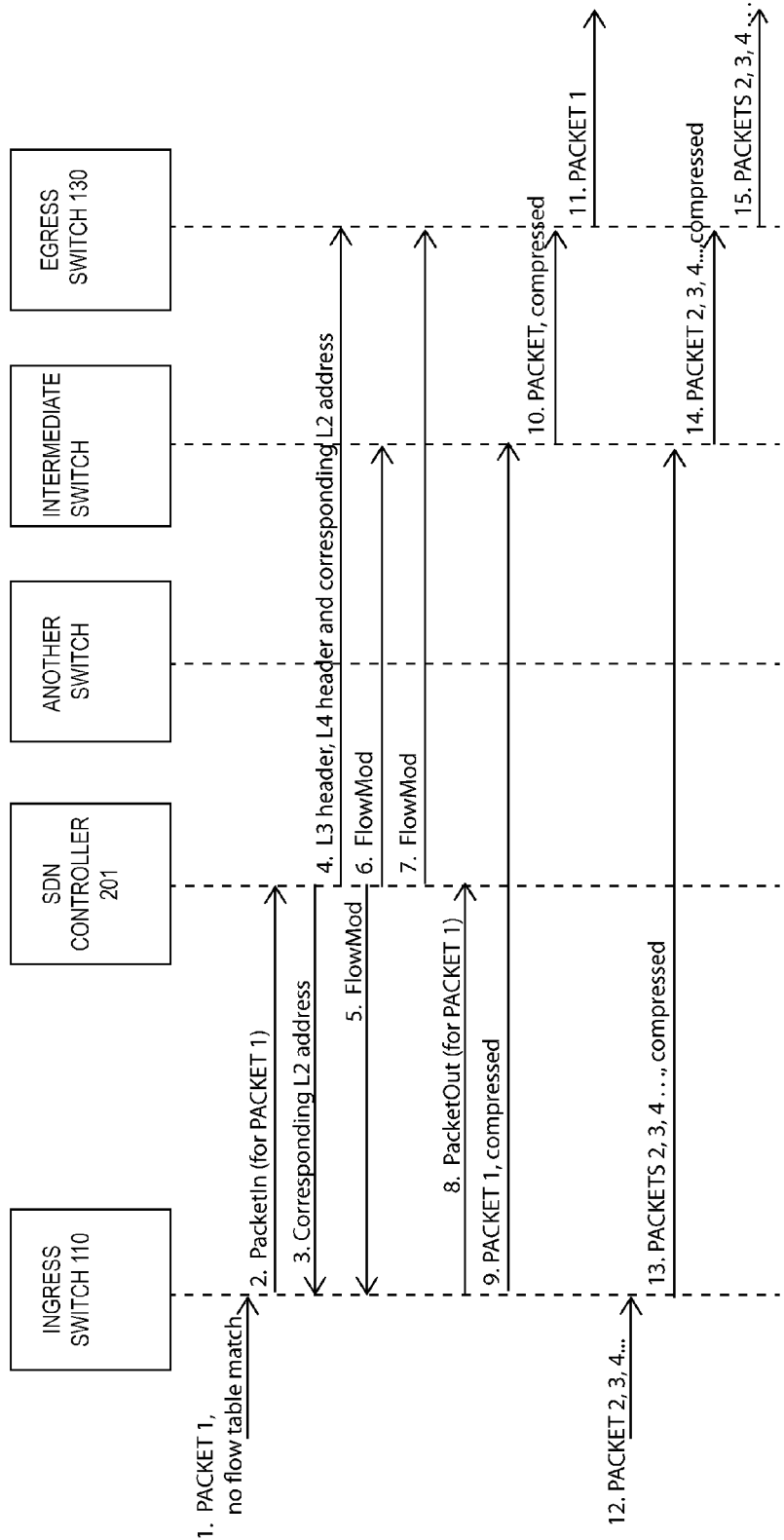
FIG. 16 is a diagram showing a sequence of messages in the exemplary system.

Subsequently, a person 15 places a telephone call to a person 30 via telephone circuitry 17. As a result, the ingress switch 110' receives a frame on physical inlet port 116 (FIG. 16, message 1). The received frame encapsulates a layer 3 header having a destination IP address 192.1.32.2. Message 1 does not match any entry of flow table 115 at the time shown in FIG. 15.

Figure 17:
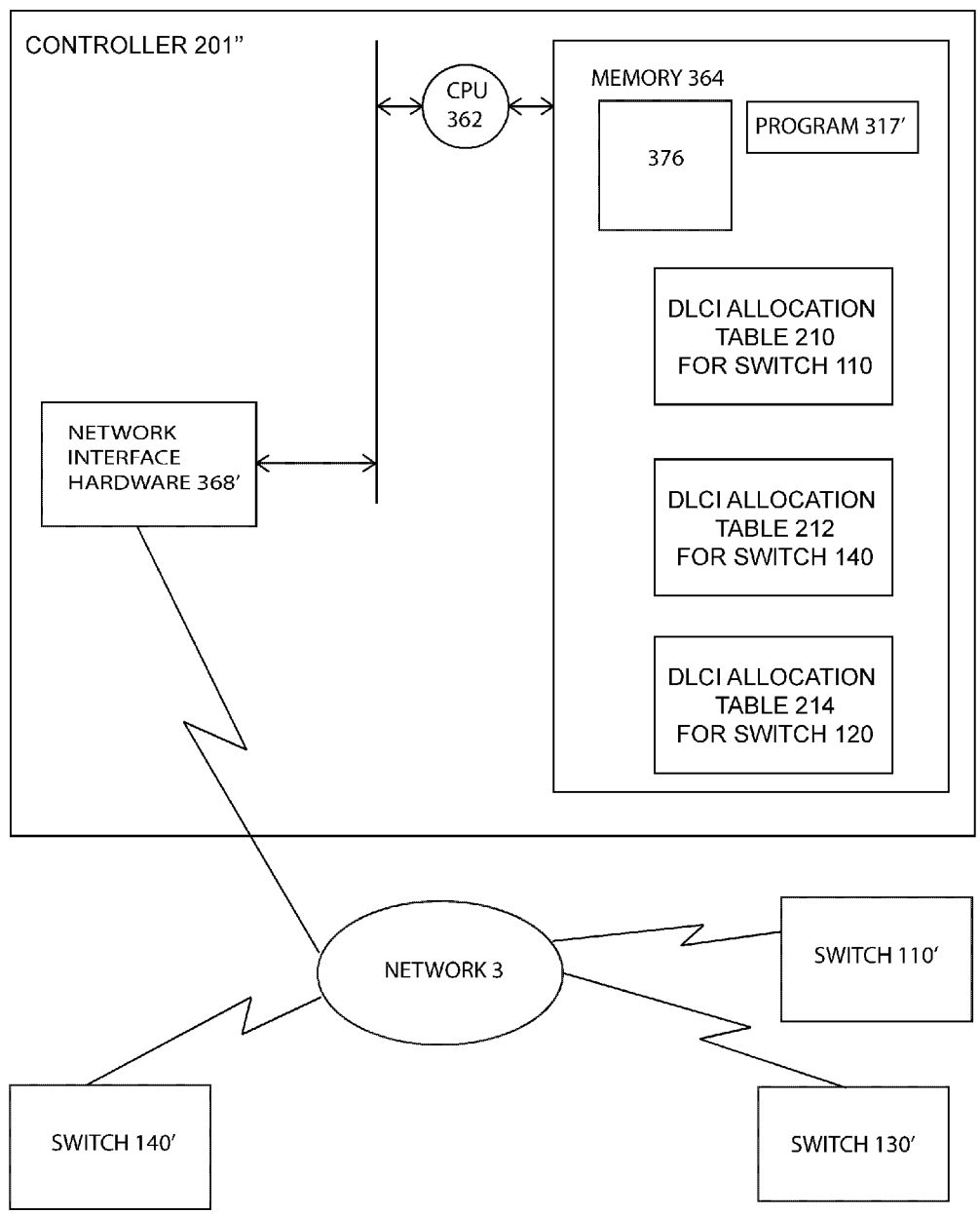
FIG. 17 is a diagram emphasizing a control plane in the exemplary system.

Circuitry in the ingress switch 110' compares the incoming packet to each entry of the flow table 115 and, responsive to not detecting a match, forwards the packet header (FIG. 16, message 2) to controller 201", shown in FIG. 17.

FIG. 17 emphasizes a control plane, with controller 201" communicating with switches 110', 140', 120', and 130' via network interface hardware 368' and network 3. Network 3 is different from the network shown in FIG. 15 that communicates data plane information. Thus, switch 110' includes first circuitry configured to communicate with network 3, and second circuitry configured to communicate with the data plane network shown in FIG. 15. Switch 130 includes first circuitry configured to communicate with network 3, and second circuitry configured to communicate with the data plane network shown in FIG. 15. Switch 140' includes first circuitry configured to communicate with network 3, and second circuitry configured to communicate with the data plane network shown in FIG. 15.

The controller 201" includes programs 317' stored in memory 364, to receive, process, and generate various control plane messages.

In response to message 2, CPU 362 and programs 317' act to search the DLCI allocation table 210, to locate a currently unused data link connection identifier (DLCI) for a connection from ingress switch 110'.

In response to message 2, CPU 362 and programs 317' act to search the DLCI allocation table 212, to locate a currently unused DLCI for a connection from switch 140'.

In general, controller 201" includes a DLCI allocation table for each connection between switches in the frame relay network shown in FIG. 15. Thus, when an intermediate switch, such as switch 140', is in the path between the ingress switch and output switch, CPU 362 and programs 317' act to search an additional DLCI allocation table, one corresponding to a connection from the intermediate switch.

The controller 201" sends a flow table entry, corresponding to the layer 2 header data, to the ingress switch 110'. (FIG. 2, message 5). The flow table entry includes an unused DLCI (having octal value 0570) found in allocation table 210.

In response to message 5, the ingress switch 110' generates the following flow table 115:
Values to be matched: physical inlet port 1, destination IP address 192.103.45.27, destination UDP port 375
Action: DLCI 0321, physical outlet port number 2
Values to be matched: physical inlet port 1, destination IP address 26.103.045.037, destination UDP port 375
Action: DLCI 0164, physical outlet port number 2
Values to be matched: physical inlet port 1, destination IP address 192.1.32.2, destination UDP port 375
Action: DLCI 0570, physical outlet port number 2

Flow Table 115

The controller 201" sends a flow table entry, corresponding to the layer 2 header data, to the switch 140'. (FIG. 2, message 6). The flow table entry includes an unused DLCI (having octal value 0375) found in allocation table 212.

In response to message 6, the switch 140' generates the following flow table 145:
Values to be matched: physical inlet port 1, DLCI 0321
Action: DLCI 0322, physical outlet port number 5
Values to be matched: physical inlet port 1, DLCI 0164
Action: DLCI 0442, physical outlet port number 5
Values to be matched: physical inlet port 1, DLCI 0570
Action: DLCI 0375, physical outlet port number 5

Flow Table 145

The controller 201" sends a decompression context, and the corresponding layer 2 header data, to the egress switch 130'. (FIG. 16, message 4). The controller 201" sends the decompression context, and the corresponding layer 2 header data, to the egress switch 130' via a signal path that excludes (bypasses) the ingress switch 110'.

Figure 18:
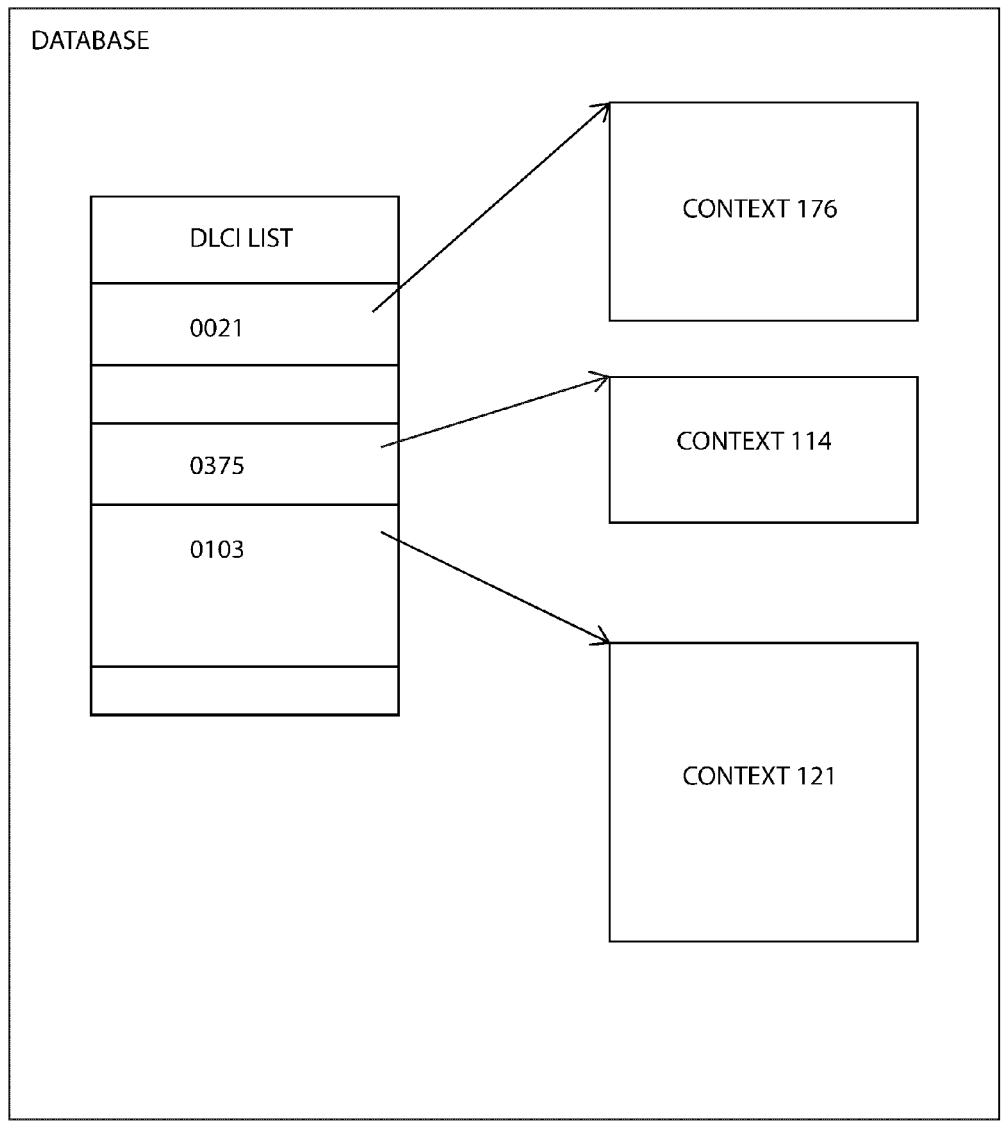
FIG. 18 is diagram showing a data structure in an egress switch, to link a flow table entry (or DLCI) to a decompression context.

In response to receiving message 4, the egress switch 130' generates the data structure shown in FIG. 18, to associate DLCI 0375 with decompression context 114. Thus, in effect, the DLCI acts as a context identifier.

In general, the controller 201 also sends a flow table entry, corresponding to the layer 2 header data, to any intermediate switch(es). In this case, when an intermediate switch subsequently receives a frame via the ingress switch, the intermediate switch matches a flow table entry in response to the DLCI received by the intermediate switch. This matching of the flow table entry, in the intermediate switch, can cause the intermediate switch to forward the payload encapsulated by a frame having a DLCI destination field different from that used by the ingress switch to forward the frame to the intermediate switch. Subsequently, the egress switch receives the frame sent by the intermediate switch and, responsive to the DLCI written by the intermediate switch, selects a context that the egress switch uses to restore the uncompressed IP and UDP headers. Thus, when the DLCI acts as a header identifier, the egress switch restores the IP and UDP headers using an identifier different from the DLCI sent by the ingress switch. In other words, the egress restores (generates) the IP and UDP headers using an identifier that was not sent by the ingress switch.

The controller 201 sends a flow table entry, corresponding to the layer 2 header data, to the egress switch 130'. (FIG. 2, message 7).

In response to message 7, the egress switch 130' generates the following entry in flow table 135.
Values to be matched: physical inlet port 7, DLCI 0375
Action: physical outlet port number 0

Flow Table 135

The controller 201" instructs the ingress switch 110' to send PACKET 1. (FIG. 2, message 8).

The ingress switch 110' replaces the headers, from layers 3 and 4, with a compressed equivalent (FIG. 16, message 9). In this case, the compressed equivalent is the DLCI 0570.

The egress switch receives the layer 2 frame, sent by the intermediate switch 140', and uses the layer 2 header to access the corresponding context, and decompress the frame, restoring the full headers for layers 3 and 4. (FIG. 16, message 11).

Subsequent packets (messages 12) belonging to this flow (matching this flow table entry) are compressed by the switch 110', and sent by the switch 110', to the egress switch 130', via intermediate switch 140', (messages 13 and 14) without passing through the controller 201.

More specifically, FIG. 19 shows a message 12 received at the ingress switch 110'. The message 12 includes a destination IP header address, and destination IP packet length. The switch 110' uses, inter alia, the IP header destination address to match the third entry in flow table 115.

In FIG. 19, the length of the UDP header is 8 bytes, and the length of the IP header is 40 bytes.

In response to matching the flow table entry, switch 110' replaces the IP header with a compressed IP header and a compressed UDP header. The compressed data does not include a destination IP address. The compressed IP header does not include a length of the IP packet.

Switch 110' generates a message 13, shown in FIG. 2, and in more detail in FIG. 20.

When switch 140' received a message 13, switch 140' uses the DLCI received in the message to match a flow table entry 145. Switch 140' then generates a message 14, shown in detail in figured 21.

When egress switch 130' receives a message 14, switch 130' uses, inter alia, the DLCI received in the message to match an entry in flow table 135. Egress switch 130 also uses the DLCI to find a decompression context, in the database shown in FIG. 18. More specifically, egress switch 130' conditionally selects a decompression context, from among a plurality of decompression contexts, depending on whether the decompression context is stored in association with the DLCI.

Responsive to the matching of the flow table entry, egress switch 130 replaces the compressed data with a complete IP header, and complete UDP header, thereby generating a message 15 shown in FIG. 15, and in more detail in FIG. 22.

The controller 201" is typically separated from ingress switch 110' by more than 1 kilometer. The controller 201" is typically separated from egress switch 130' by more than 1 kilometer.

The ingress switch 110' is typically separated from egress switch 130' by more than 1 kilometer. The intermediate switch 140' is typically separated from egress switch 130', from ingress switch 110', and from controller 201" by more than 1 kilometer.

Summary

In summary, the controller 201, the ingress switch 110, and the egress switch 130, each include a type of processor in a software defined network. The controller 201 acts to receive, in a control plane, a packet header (in a Packet-in message) sent from the ingress switch 110, the packet header having been sent in response to the ingress switch 110 receiving a packet in a data plane, and the packet header not matching a flow table entry in the ingress switch 110. The controller 201 acts to send, in the control plane, an IP address and UDP address to the egress switch 130, the IP address and UDP address acting as a context for decompression in egress switch 130. The controller 130 encodes the IP address and UDP address as text, before sending the text to egress switch 130.

The controller 201 acts to send a flow table entry, containing a DLCI, which is a type of identifier, to the ingress switch 110, to cause the ingress switch 110 to encapsulate data from network 5 in a frame relay frame including a destination field containing the DLCI. A frame relay frame is a type of data structure.

The egress switch 130 acts to receive a frame from the ingress switch 110 and, responsive to the destination DLCI of the received frame, compare the received DLCI to a plurality of flow table entries stored in the egress switch 130.

Using the data structure shown in FIG. 9, the egress switch 130 selects a context for decompression, by using the DLCI of the received frame as an access key. The egress switch 130 generates an uncompressed IP header and uncompressed UDP header, using the selected context.

As exemplified by messages 15 in FIG. 2, the egress switch 130 generates uncompressed headers a plurality of times per each performance of the step of sending DLCI to egress switch 130 in message 4.

The Ingress switch 110 compresses headers separately from any compression preformed on the voice payload data.

As exemplified in FIGS. 7-8, the ingress switch 110 may act to compress data so that layer 3 and layer 4 headers are represented, in part, by a delta: a change from the previous value of a field rather than the current value. In other words, delta fields are encoded as the difference to the value in the previous packet in the same packet stream. The egress switch 130 then updates the context by adding the value in the compressed header to the value in its context. The result is the proper value of the field.

As exemplified in FIGS. 12-14, the ingress switch 110 may act to compress data so that layer 3 and layer 4 headers are represented only by the context identifier (the DLCI). In the case, all uncompressed IP header and UDP header fields are inferred from other values, for example the size of the frame carrying the packet, or from events, such as the number of frames received indicating the value of the time to live (TTL) field of the IP header.

Thus, the controller 201's sending of the DLCI causes the ingress switch 110 to send subsequently received data in compressed form. The compressed form includes digital samples of voice data encapsulated by a layer 2 header having the DLCI as the destination address.

Although, in an example described above, the controller does not send voice information to the egress switch, in an alternate embodiment of the invention, the ingress switch forwards the entire first packet of a new flow to the controller, and the controller adds a decompression context and forwards the entire packet including digital samples of voice data (payload) to the egress switch. Thus, the time it takes to set up a connection and start the packet flow out of the egress switch, is shortened.

In another alternate embodiment, the ingress switch continues to forward entire packets of a new flow to the controller until establishment of the compression context, or other substitute data scheme, enables the ingress switch to send packets directly to the egress switch, thereafter bypassing the controller. The controller forwards those initial packets to the egress switch, with the decompression context for example. This could be useful for voice whose packets typically arrive every 20 ms; several packets could arrive during the time it takes the controller to calculate and deliver a context.

In yet another alternate embodiment, the first packet that triggers the connection setup is a signaling packet that does not contain digital samples of voice data. Thus, the ingress switch recognizes the signaling packet, such as an INVITE message from an entity using the Session Initiation Protocol (SIP), H.323, or another signaling method. The ingress switch in response to such a packet forwards the packet to the controller for parsing and action. One possible action is to set up a connection via entries in routing tables for the requested voice path while forwarding the signaling packet to the voice server responsible for the called phone number or SIP address. In this case the ingress switch can have an appropriate entry already configured in the ingress switch routing table when the first packet containing a voice payload arrives, minimizing post-dial delay in setting up a call.

Throughout this Patent Application, certain processing may be depicted in serial, parallel, or other fashion, for ease of description. Actual hardware and software realizations, however, may be varied depending on desired optimizations apparent to one of ordinary skill in the art.

Benefits, other advantages, and solutions to problems have been described above with regard to specific examples. The benefits, advantages, solutions to problems, and any element(s) that may cause any benefit, advantage, or solution to occur or become more pronounced are not critical, required, or essential feature or element of any of the claims.

The invention in its broader aspects is therefore not limited to the specific details, representative apparatus, and illustrative examples shown and described. For example, although a DLCI has been exemplified as a header identifier or header decompression context identifier, the role of such an identifier can be fulfilled by, for example, an MPLS label, or an ATM channel identifier.

Additional advantages and modifications will readily occur to those skilled in the art. Accordingly, departures may be made from such details without departing from the spirit or the scope of Applicants' general inventive concept. The invention is defined in the following claims. In general, the words "first," "second," etc., employed in the claims do not necessarily denote an order.

What is claimed is:

1. A method comprising steps, performed by a first processor, of receiving a first packet-header sent from a second processor, the first packet-header having been sent in response to the second processor receiving the first packet-header encapsulated in a frame, and the frame not matching a flow table entry in the second processor; sending a first signal to the second processor; sending a first flow table entry to the second processor; sending a second signal to a third processor; and sending a second flow table entry to the third processor, wherein sending the first signal causes the second processor to generate substitute data in response to subsequently receiving a second packet-header, the substitute data being shorter that the second packet-header, the substitute data corresponding to the first signal, and sending the second signal causes the third processor to generate the second packet-header, responsive to the substitute data subsequently received from the second processor, in accordance with the second signal.

2. A method according to claim 1 wherein the first signal includes an identifier for a compression context, and the second signal includes the identifier.

3. A method according to claim 1 wherein the first signal includes a layer 2 destination address, and the second signal includes the layer 2 destination address.

4. A method according to claim 1 wherein the first signal includes a layer 2 destination address, and the second signal includes the layer 2 destination address, wherein the layer 2 destination address acts as an identifier to allow the third processor to select a context for decompressing data.

5. A method according to claim 1 wherein the second signal includes a context to be used to decompress subsequently received data.

6. A method according to claim 1 wherein the first processor sends the first signal and the first flow table entry, to the second processor, in a common frame, the common frame including a destination field.

7. A method according to claim 1 wherein second processor constitutes a network ingress switch including a plurality of exit ports, and the first flow table entry designates one of the plurality of exit ports.

8. A method according to claim 1 further comprising the step, performed by the first processor, of sending a first identifier to the second processor, to cause the second processor to encapsulate the packet header in a data structure including a destination field corresponding to the first identifier.

9. A method according to claim 8 wherein the first identifier includes a data link connection identifier.

10. A method according to claim 1 wherein the packet received by the second processor includes payload data encapsulated by a layer 4 header, and the first processor does not send the payload data to the third processor.

11. A method according to claim 1 wherein the packet received by the second processor includes a layer 4 header including payload length data, and the first processor does not send the payload length to the third processor.

12. A method according to claim 1 further including the steps, subsequently performed by the second processor, of receiving a second packet; comparing the received second packet to a plurality of flow table entries stored in the second processor; responsive to the comparing step, selecting one of the plurality of flow table entries; compressing the received second packet, in accordance with a context corresponding to the selected entry, to generate a compressed packet; sending the compressed packet.

13. A method according to claim 12 wherein the step of receiving a second packet is performed a plurality of times per each performance of the step of sending the first signal.

14. A method according to claim 12 wherein sending includes sending the compressed packet encapsulated in a frame relay frame.

15. A method according to claim 1 wherein the first processor acts as a controller in a software defined network, the software defined network including a routing system, the second processor acts as an ingress switch in the software defined network, and the third processor acts as an egress switch in the software defined network, and the method further includes the step, performed by the first processor, of sending a first identifier to the second processor, and the steps, performed by the second processor, of receiving a second packet; encapsulating the received second packet in a data structure, the data structure including a destination field corresponding to the first identifier; sending the data structure to cause the routing system to be responsive to destination field, thereby sending the data structure to the third processor.

16. A method according to claim 15 wherein the first identifier includes a bit, the routing system routes the data structure responsive to the bit, and the third processor selects a context responsive to the bit.

17. A method according to claim 16 wherein the first identifier includes a plurality of bits, the routing system routes the data structure response to each of the plurality of bits, and the third processor selects a context responsive to each of the plurality of bits.

18. A method according to claim 1 wherein the first processor acts as a controller in a software defined network, the software defined network including a routing system, the second processor acts as an ingress switch in the software defined network, and the third processor acts as an egress switch in the software defined network, and the method further includes the steps, performed by the second processor, of receiving a second packet; comparing the received second packet to a plurality of flow table entries stored in the second processor; responsive to the comparing step, selecting one of the plurality of flow table entries; compressing the received second packet, in accordance with a context corresponding to the selected entry, to generate a compressed packet; encapsulating the received second packet in a data structure, the data structure including a destination field corresponding to the first identifier; sending the data structure to cause the routing system to be responsive to destination field, thereby sending the data structure to the third processor.

19. A method according to claim 1 the second signal includes a context for decompression, the context including a layer 3 address encoded as text.

20. A method according to claim 19 wherein sending the text is formatted as Extensible Markup Language (XML).

21. A method according to claim 1 wherein the first processor acts as a controller in a software defined network, the software defined network including a routing system, the second processor acts as an ingress switch in the software defined network, and the third processor acts as egress switch in the software defined network, wherein sending the second signal includes sending the second signal via a path that does not include the second processor.

22. A method according to claim 1 further including the step of sending an instruction, in a control plane, to cause the second processor to send the packet header, in a data plane.

23. A method according to claim 1 wherein the second processor receives the packet from a network operated on behalf of a first entity, the second processor is operated on behalf of a second entity, and the first entity is non-affiliated with the second entity.

24. A method according to claim 1 wherein the substitute data depends on the second packet-header.

25. A method according to claim 23 wherein the substitute data includes a compressed form of the second packet-header.

26. A method according to claim 1 wherein the first processor does not send digital samples of voice data to the third processor.

27. A method according to claim 1 wherein the first packet-header includes header length data, and the first processor does not send the header length data to the third processor.

28. A method according to claim 1 wherein the first packet-header encapsulates digital samples of voice data.

\* \* \* \* \*